Figure 1:
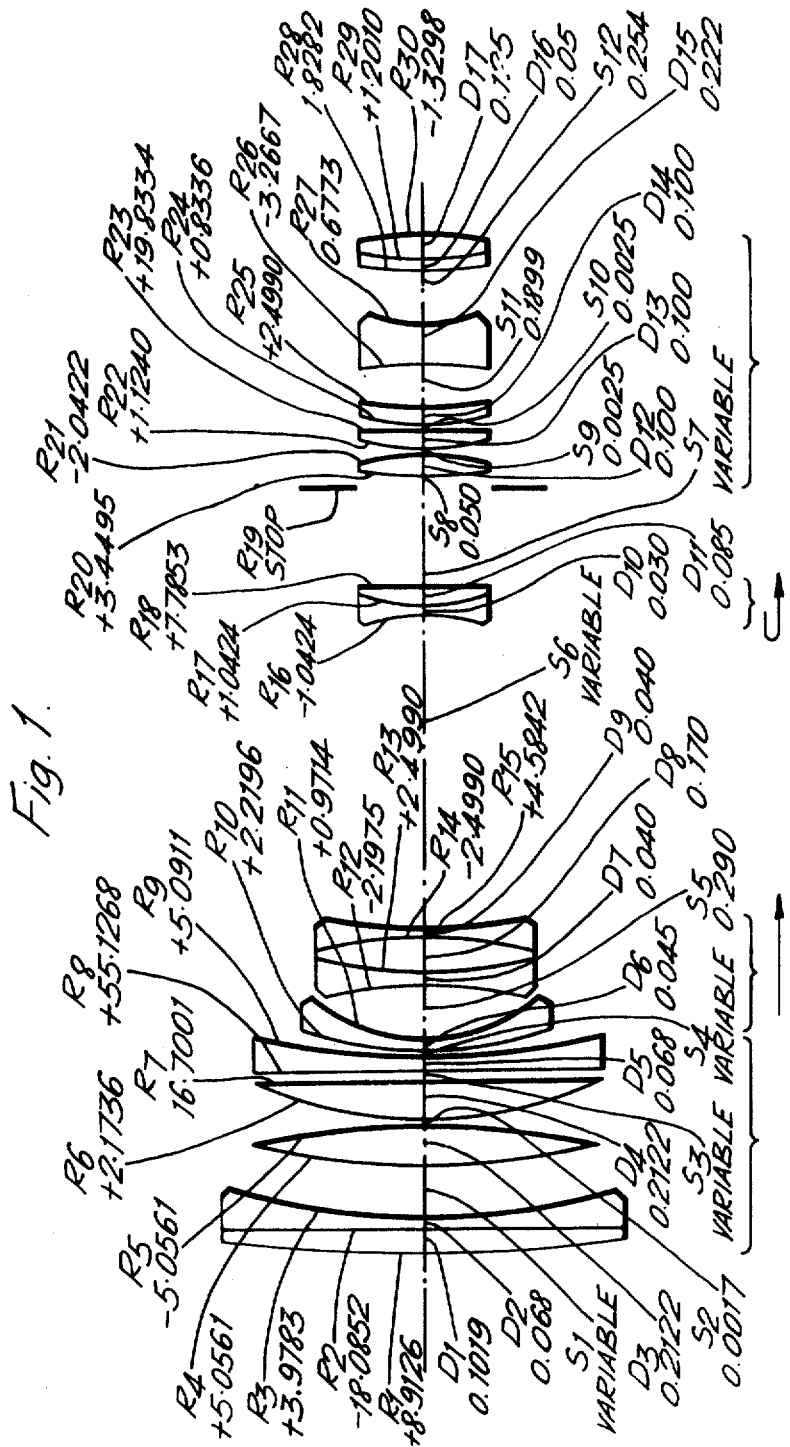

United States Patent

[11] 3,598,476

[72] Inventor Peter Arnold Merigold
 Prestatyn, Wales
[21] Appl. No. 816,630
[22] Filed Apr. 16, 1969
[45] Patented Aug. 10, 1971
[73] Assignee The Rank Organization Limited
[32] Priority July 26, 1965
[33] Great Britain
[31] 31,812/65
 Continuation-in-part of application Ser. No. 567,207, July 22, 1966, now abandoned.

[54] ZOOM LENS FRONT MEMBER ADJUSTABLE FOR FOCUSING
 8 Claims, 3 Drawing Figs.
[52] U.S. Cl. .................................................. 350/186
[51] Int. Cl. .............................................G02b 15/16, G02b 15/18
[50] Field of Search .......................................... 350/184, 186

[56] References Cited
 UNITED STATES PATENTS
 1,947,669 2/1934 Warmisham et al. ......... 350/184

| | | | |
|---|---|---|---|
| 3,011,403 | 12/1961 | Dlutzik | 350/184 X |
| 3,294,471 | 12/1966 | Back | 350/184 |
| 3,346,320 | 10/1967 | Macher | 350/184 |

FOREIGN PATENTS
1,434,747  2/1966  France ............... 350/184

Primary Examiner—John K. Corbin
Assistant Examiner—Paul A. Sacher
Attorney—Holcombe, Wetherill & Brisebois ABSTRACT: A front member for a zoom lens which is corrected for aberration defects and incorporates members movable for zooming behind said front member, which front member remains stationary during zooming and consists of three portions, namely a divergent front portion, a convergent intermediate portion and a divergent rear portion, of which only the intermediate portion is movable to effect focusing of the complete objective throughout a range of object distances, the equivalent focal lengths of the three portions being selected in relation to the equivalent focal length of the complete front member to permit stabilization of aberrations throughout the range of focusing movement of the intermediate portion.

ZOOM LENS FRONT MEMBER ADJUSTABLE FOR FOCUSING

This application is a continuation of my prior copending application, Ser. No. 567,207, filed July 22, 1966, now abandoned.

BACKGROUND OF THE INVENTION

In zoom objectives, accommodation for change of object distance is usually achieved by imparting an additional movement to the front member of the objective under the control of a focusing control element. This, however, involves mechanical difficulties, especially when the front member itself participates in the zooming relative movements, but even when such member does not so participate, so that its movements are confined to those required for focusing purposes, mechanical difficulties still arise when there is a wide range of variation of equivalent focal length, for in practice the front member must have a wide relative aperture and must also be of relatively complex structure in order to facilitate correction of the aberrations, not only throughout the zooming range, but also throughout the focusing range, and must consequently be quite bulky and heavy.

PRIOR ART

An improved focusing arrangement for a zoom objective, wherein such difficulties are materially reduced, forms the subject of the copending U.S. Pat. application Ser. No. 312,699, filed on Sept. 30, 1963, now U.S. Pat. No. 3,296,596, in the names of G. H. Cook and P. A. Merigold. The objective according to the invention of such copending application comprises a front member which for a given object position remains stationary during the zooming relative movements, an assembly located behind the front member and incorporating the members of the objective movable for zooming purposes, and a stationary rear member, wherein the front member is divided into front and rear portions and focusing to suit different object positions is effected by axial movement only of the rear portion of the front member, the stationary front portion of the front member being approximately afocal (that is having an equivalent focal length numerically greater than $4f_A$, where $f_A$ is the equivalent focal length of the complete front member for an infinitely distant object) and including a divergent element and a convergent element, while the rear portion of the front member is convergent and has an equivalent focal length between $0.75f_A$ and $1.25f_A$. In the preferred arrangement, the stationary front portion of the front member consists of a doublet component, while the movable rear portion thereof consists of two simple convergent components.

The construction of the front member according to such copending application has the great advantage that only a relatively light portion thereof is moved for focusing purposes, thus considerably simplifying the mechanical problems involved in the focusing movement, and at the same time the arrangement also simplifies the problem of approximately stabilizing the residual aberrations of the front member throughout a wide focusing range. Such stabilization is effected by suitable dimensioning of the parts of the front member, so that the sum of the contributions of the individual surfaces of the front member to the various aberrations is approximately constant throughout the focusing range. If then the assembly behind the front member incorporating the members movable for zooming purposes is such as approximately to stabilize its aberrations throughout the zooming range, it will be clear that the residual aberrations of the combination of the front member with such assembly will be approximately stabilized throughout both the focusing range and the zooming range and can be balanced out by suitable design of the stationary rear member of the objective. In practice, however, it is found that, although fairly good stabilization of the aberrations throughout the focusing movement can be achieved with the front member of such prior arrangement, the level at which such stabilization is effected presents difficulty in balancing out in the zooming assembly and in the stationary rear member.

OBJECT OF THE INVENTION

The present invention has for its object to provide a zoom objective with an improved construction of the front member, wherein, while retaining the advantages of such prior arrangement, a higher standard of aberration stabilization throughout the focusing range can be obtained and at a more convenient level.

The optical objective of the zoom type, according to the present invention, is corrected for spherical and chromatic aberrations, coma, astigmatism, field curvature and distortion, and comprises a front member which for a given object position remains stationary during the zooming relative movements, an assembly located behind the front member and incorporating the members of the objective movable for zooming purposes, and a stationary rear member, and is characterized by the improvement that the front member is divided into three portions and focusing to suit different object positions is effected by axial movement only of the middle portion, the front and rear portions remaining stationary, each of such front and rear portions being divergent and having equivalent focal length between $1.5f_A$ and $7.5f_A$ (where $f_A$ is the equivalent focal length of the complete front member when focused for an infinitely distant object), while the movable middle portion is convergent and has equivalent focal length numerically lying between $0.25f_A$ and $1.0f_A$.

The movement of the intermediate portion, alone out of the three portions, facilitates solution of the mechanical problems involved in focusing. The use of a convergent portion disposed between two divergent portions facilitates aberration stabilization, especially of chromatic aberrations, more particularly because the effect on aberrations of the negative power distributed through the front portion can be arranged, on average, to be compensated by the effect on aberrations of the positive power distributed through the intermediate portion. Furthermore, the stationary rear portion affords the opportunity for stabilizing the aberrations at a preferred level, while still retaining the advantage that only a relatively light portion of the front member is movable for focusing purposes. These theoretical considerations can, however, only be realized in practice within certain limits as to the distribution of powers throughout the front member as a whole, bearing in mind that, in general, the introduction of extremely high powers makes aberration stabilization virtually impossible. This places a lower limit on the focal length of each of the three portions of the front member. On the other hand, at the opposite end and upper limit on the focal length of each of the three portions is required in order that focusing may be achieved within a practical range of movement of the intermediate portion. These limitations have been set forth in the preceding paragraph.

In the specific embodiments hereinafter described, the focal lengths of the three portions of the front member have been chosen near the middle of the specified range of focal lengths, since such location represented a good compromise between the two extremes and was compatible with the "target specification" for a particularly useful lens, but departures closer to one end or the other of the specified range of focal lengths may be necessitated by target specifications devised to meet other requirements.

In connection with the above it will be clear that a zoom lens, of the type with which the present invention is concerned, consists of three basic parts, namely a front member which is adjustable for focusing, an intermediate part comprising the members movable for zooming, and a stationary rear member. The heart of the lens lies in the intermediate part, which is designed in accordance with a number of predetermined relationships in order to achieve a certain combination of specific results of mechanical and optical nature. The design of this intermediate part of the lens may in itself involve invention. In the present application one example is described of a lens having an intermediate part designed in accordance with the invention of copending application Ser. No. 309,208 in the names of G. H. Cook and P. A. Merigold, while two further examples are described of lenses having intermediate parts both designed in accordance with the different invention of copending application Ser. No. 561,539 in the name of P. A. Merigold. It will thus be apparent that the three parts of a zoom lens can, in their basic aspects, be designed independently of one another. This is because, as far as correction of aberrations is concerned, the three parts are required to possess basic constructions suited to three different requirements, respectively. Thus the design of the intermediate part must be such as to permit a selection of parameters which enables the aberrations appearing in this part of the objective to be stabilized throughout the range of the zooming movements. Similarly, the design of the front part must be such as to permit a selection of parameters which enables the aberrations appearing in this part of the objective to be stabilized throughout the focusing range. The rear part has to be of such a basic design that its parameters can be selected to correct the aberrations which have been stabilized in the front and intermediate parts. The design of the rear part is thus analogous to the design of a fixed focus lens intended to possess a predetermined focal length (in order to give a chosen back focal length to the zoom lens) and to correct a fixed aberration level. This part of the objective is therefore open to a wide range of possible designs and suitable variants readily to be calculated by the lens engineer on a routine basis. However, the present application is concerned with the front part, i.e. the front member, of the zoom lens, the basic design of which is a problem analogous to that involved in design of the intermediate part. This particular invention provides a front member for a zoom lens which permits the focusing mechanism to be simple, light and compact and at the same time, without introducing undue complexity of the objective member itself, permits an extremely high degree of aberration stabilization with focusing to be achieved.

FURTHER FEATURES OF THE INVENTION

Stabilization of spherical aberration, coma and astigmatism, especially at the short focusing distances, can be assisted by making the rear surface of the stationary front portion of the front member convex to the front with radius of curvature lying between $0.5f_A$ and $2.0f_A$. The general aim is to keep this radius of the order of $f_A$, but selection of the value of this parameter nearer the lower or upper limit is permissible if the equivalent focal length of the front portion has been predetermined to lie close to its lower or upper limit, respectively.

Although in some instances, when only a low relative aperture is required, such stationary front portion may consist only of a simple component, it will usually be preferable for such portion to comprise a doublet component having a dispersive internal contact, the mean refractive index of the material of the rear element of such component exceeding that of the front element thereof by between 0.05 and 0.15, while the Abbe V number of the material of the front element of such component exceeds that of the rear element thereof by more than 15. This assists in stabilizing throughout the focusing range of the chromatic aberrations, and especially of oblique chromatic aberration at the wide-angle end of the zooming range. The arithmetic mean between the mean refractive indices of the materials of the two elements of such doublet component is preferably greater than 1.700, thereby assisting in the stabilization of astigmatism, distortion and field curvature throughout the focusing range. Further assistance in the stabilization of astigmatism and oblique chromatic aberration can be obtained when the internal contact in such doublet component is concave to the front with radius of curvature greater than $2f_A$. The general aim in providing a doublet component is to spread the load of divergent power in the front portion, so that no one surface need in itself be of extremely high power. However, having introduced said doublet component, stabilization of the above-mentioned aberrations is assisted if the divergent power in this component is primarily obtained from choice of glasses, keeping as small as possible the curvature of the internal contact. When the equivalent focal length of the front portion has been predetermined to lie near its upper limit, the difference between the mean refractive indices (and Abbe V numbers) of the glasses used may be minimized, particularly if high-index glasses (index greater than 1.700) are employed to ensure the introduction of sufficient divergent power at the previously mentioned rear surface of the front portion. However, when the equivalent focal length of the front portion has been predetermined to lie near its lower limit, the difference between the mean refractive indices of the glasses used can be increased up to 0.15, and also a curvature up to $2f_A$ can be introduced at the internal contact. Beyond these limits the high power created makes difficult the problem of stabilizing aberrations.

While in some instances the movable middle portion of the front member may consist of a single compound component, such middle portion preferably consists of two convergent components, each having equivalent focal length between $0.75f_A$ and $1.5f_A$. Selection of the values of these parameters nearer to the lower or upper limits is directly dependent on the overall equivalent focal length determined for the middle portion. In such case, the front surface of the front component of such middle portion is preferably convex to the front with radius of curvature between $0.5f_A$ and $2.5f_A$, the front surface of the rear component of such middle portion being convex to the front with radius of curvature between $0.25f_A$ and $1.25f_A$. These features contribute towards the stabilization of spherical aberration, coma and astigmatism throughout the focusing range. Here, the general aim is again to spread the load of convergent power and also to balance the negative power of the front portion. Thus, when substantial divergent power is present in the front portion, the said two surfaces of the middle portion must have radii of curvature near the lower limits, but when the divergent power of the front portion is relatively small, i.e. the equivalent focal length of this portion lies near its upper limit of $7.5f_A$, then the said two surfaces of the middle portion can have radii of curvature near the upper limits, subject to providing this middle portion with an equivalent focal length not greater than $1.0f_A$ in order to ensure that focusing can be achieved within a practical range of movement of said middle portion.

The two components of such middle portion are preferably simple components, the arithmetic mean between the mean refractive indices of the materials of such components lying between 1.575 and 1.700, and the arithmetic mean between the Abbe V numbers of such materials being greater than 50. This contributes towards stabilization of astigmatism and oblique chromatic aberration throughout the focusing range. Here again, the object is to introduce power by choice of glasses, but this time an upper limit is necessary because of the curvature of the surfaces involved.

It is desirable to locate the rear nodal point of the complete front member well to the rear and sometimes even beyond the rear surface of the front member, thus making it possible, not only to accommodate the desired zooming movements of the members of the assembly behind the front member without risk of fouling between the front member and such assembly and with minimum increase in the overall length of the objective, but also to achieve a good compromise between the diameters and relative apertures of the individual members. For this purpose, the sum of the axial thicknesses of the two simple components of the middle portion of the front member preferably lies between $0.075f_A$ and $0.4f_A$. Beyond the lower limit constructional problems arise and beyond the upper limit the rear nodal point is not sufficiently to the rear. Selection will tend towards the lower limit, compatible with the selected values for the curvatures of the surfaces involved.

The total axial movement of the middle portion of the front member within the focusing range preferably lies between 0.05 and 2.0 times the equivalent focal length of such middle portion. Selection within the range is generally inverse to the equivalent focal length predetermined for the middle portion, in order to achieve focusing within an acceptable absolute range of movement. Such middle portion moves forwardly from the position for an infinitely distant object to the position corresponding to the shortest focusing distance.

The stationary rear portion of the front member, while it may be in the form of a compound component, preferably consists of a simple divergent component, whose rear surface is convex to the front with radius of curvature between $0.75f_A$ and $2.5f_A$, the mean refractive index of the material of such component being greater than 1.600. For the purpose of stabilizing aberrations at a suitable level it is preferred to concentrate divergent power in the rear surface of the rear portion. Accordingly, a high-index glass is used, and the curvature of said surface is selected nearer to the lower or upper limit dependent on whether the equivalent focal length of said rear portion has been predetermined to lie near its lower or upper limit, respectively. Thus, more generally these features assist in enabling such rear portion to cooperate with the front and middle portions of the front member in producing good stabilization throughout the focusing range of the residual aberrations at a level favorable to the aberration stabilization throughout the zooming range to be achieved in the assembly behind the front member. Further assistance in this can be obtained by making the arithmetic mean of the Abbe V numbers of the materials of the front element of the front doublet component and of the rear simple component of the front member greater than 50.

The equivalent focal length $f_A$ of the complete front member for an infinitely distant object preferably lies between 10 and 25 times the minimum value of the ratio between the equivalent focal length of the complete objective and the $f$-number of the objective (at full aperture) within the zooming range. This assists in enabling the overall dimensions of the objective and also the relative aperture of the front member to be kept relatively small.

APPLICATION OF THE INVENTION

The improved focusing arrangement according to the present invention is especially suitable for use in zoom objectives designed to give a very wide range of variation of the equivalent focal length of the objective. For instance, this focusing arrangement can be advantageously used in a zoom objective of a type, which has recently been proposed, in which the stationary rear member of the objective is convergent, and the assembly incorporating the members movable for zooming purposes comprises two movable divergent members respectively constituting the second and third members of the objective, the iris diaphragm of the objective being stationary and located between the movable third member and the stationary rear member.

Among features or groups of features, which may usefully be incorporated in a zoom objective of such type, and with any of which the focusing arrangement of the present invention can advantageously cooperate, may be mentioned:

a. The minimum separation between the movable second and third members of the objective occurs when the equivalent focal length of the objective lies between a half and three-quarters of its maximum valve in the range of variation, the equivalent focal lengths $f_B$ and $f_C$ respectively of such second and third members each lying numerically between three and six times the minimum value of the ratio of the equivalent focal length of the objective to the $f$-number of the objective (at full aperture) in the range of variation. These features assist generally in the stabilization of the residual aberrations throughout the zooming range.

b. The movable divergent second member of the objective consists of a divergent meniscus compound component with its air-exposed surfaces convex to the front followed by a divergent simple component, and performs in the range of variation a total axial movement lying numerically between $1.5f_B$ and $2.5f_B$ while the moveable divergent third member of the objective consists of a divergent compound component followed by a simple divergent meniscus component with its surfaces concave to the front and performs in the range of variation a total axial movement lying numerically between $0.5f_C$ and $0.75f_C$. These features likewise assist generally in the stabilization of the aberrations throughout the zooming range. It should be made clear that the phrase "total axial movement" means the axial distance between the positions of the member at the two ends of the zooming range.

c. The equivalent focal lengths of the front divergent compound component and of the rear divergent simple component of the movable second member respectively lie between $4f_B$ B$8f_B$ and between $0.75f_B$ and $2f_B$, while those of the front divergent compound component and of the rear divergent simple component of the movable third member each lie between $1.5f_C$ and $3f_C$. These features contribute to the stabilization of astigmatism and distortion throughout the zooming range.

d. The front surface of the divergent simple component of the movable second member is concave to the front with a radius of curvature lying numerically between two and four times the radius of curvature of the rear surface of the divergent compound component of such second member, while the rear surface of the divergent compound component of the movable divergent third member is convex to the front with radius of curvature numerically between two and five times that of the front surface of the divergent simple meniscus component of such third member. These features contribute to the stabilization of coma throughout the zooming range.

e. The radius of curvature of the front surface of the divergent compound component of the movable second member lies numerically between $1.5f_B$ and $4f_B$, and the radius of curvature of the rear surface of such divergent compound component lies numerically between $f_B$ and $2f_B$, while the radius of curvature of the internal contact in the divergent compound component of the movable third member (such component being a doublet component lies numerically between $0.25f_C$ and $f_C$, such internal contact being concave to the front. These features contribute to the stabilization of coma and astigmatism and are also helpful to the stabilization of spherical aberration.

f. Each of the divergent compound components in the movable second and third members consists of a doublet component having a divergent element and a convergent element with a collective internal contact, the mean refractive index of the material of the convergent element exceeding that of the divergent element by between 0.05 and 0.20, while the Abbe V number of the material of the divergent element exceeds that of the convergent element by more than 25. These features contribute to the stabilization of chromatic aberrations and assist also in the stabilization of astigmatism.

g. The average value of the mean refractive indices of the materials of the divergent elements in each of the two movable members is greater than 1.625, and the average value of the Abbe V numbers of such materials is greater than 50. These features contribute to the stabilization of astigmatism, chromatic aberrations and field curvature.

h. The radius of curvature of the front surface of the divergent simple meniscus component of the movable third member lies numerically between $0.75f_C$ and $2.5f_C$, while the front surface of the divergent compound component of such third member is concave to the front with radius of curvature numerically between $f_C$ and $3f_C$. These features contribute to the stabilization of coma and astigmatism.

It should be mentioned that a surface which at one point in the range of variation (whether for focusing or for zooming purposes) contributes strongly towards the control of one type of aberration may at a different point in the range contribute in a different manner, for example to the control of a different type of aberration. It must be recognized therefore that the functions above mentioned for individual features are the primary functions for which such features are intended and that in addition they may contribute usefully towards quite different functions.

DESCRIPTION OF PRACTICAL EMBODIMENTS

Figure 2:
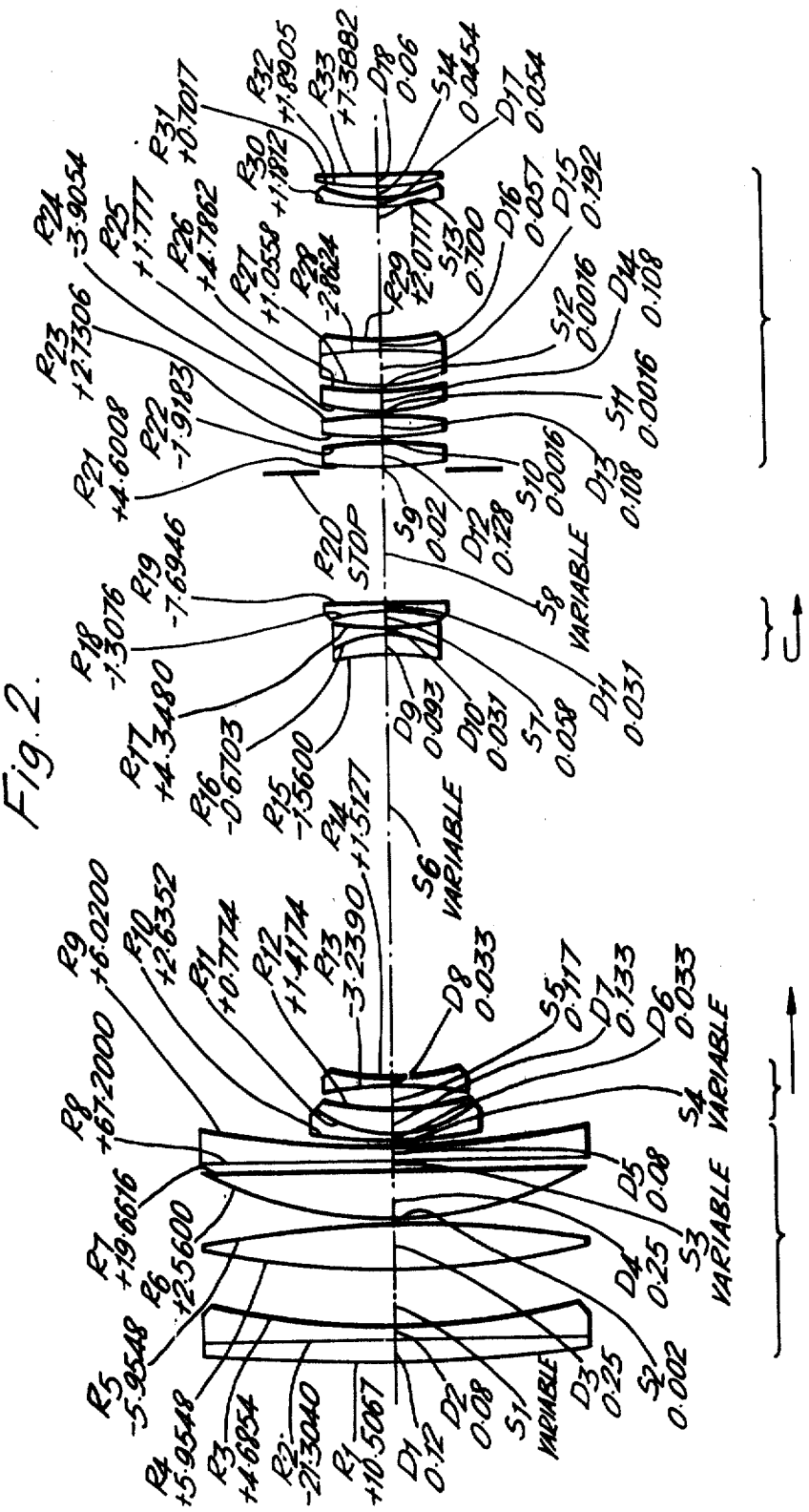
Figure 3:
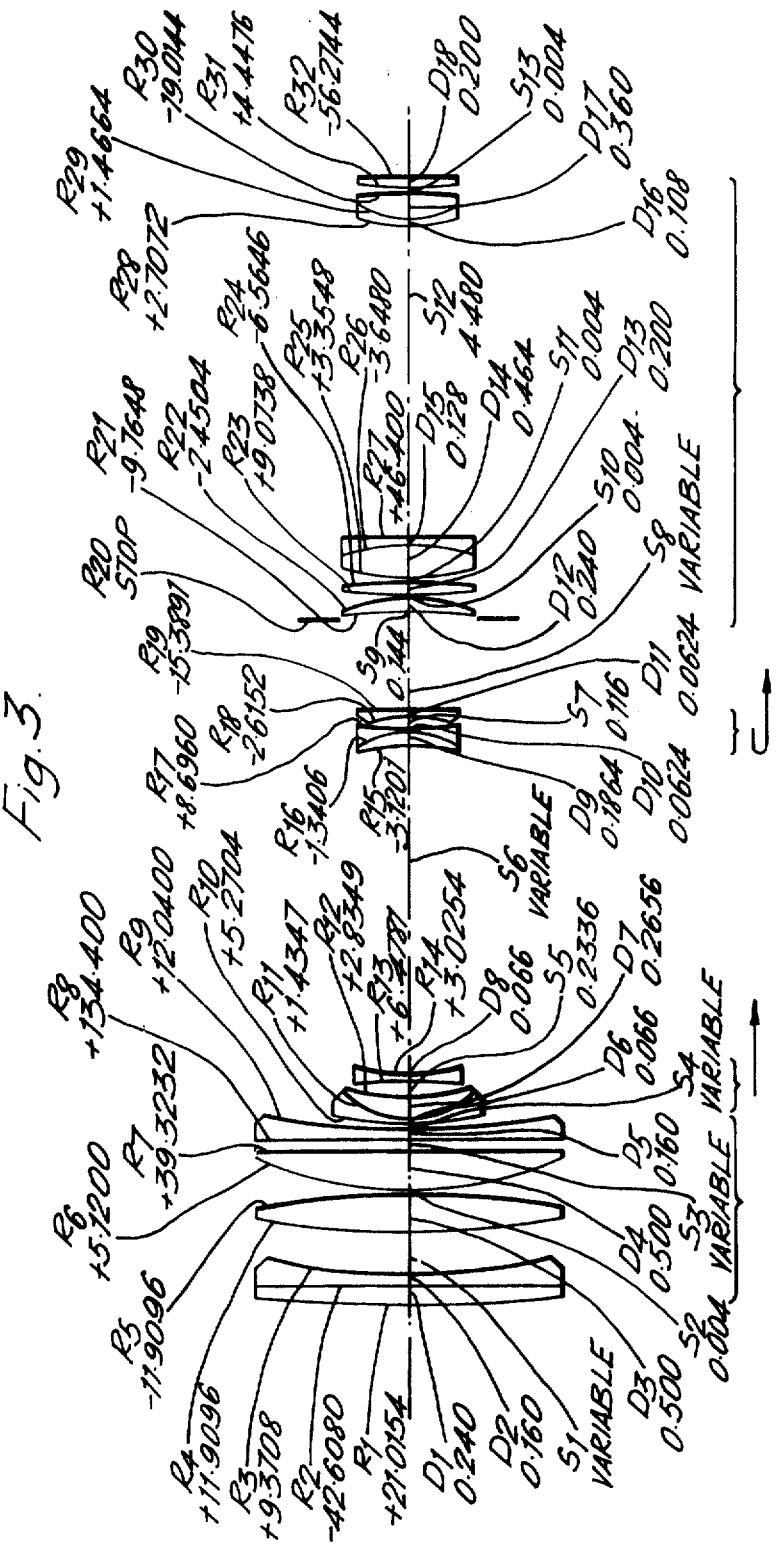

In the accompanying drawings,

FIGS. 1, 2 and 3 respectively illustrate diagrammatically three convenient practical examples of zoom objective according to the present invention.

Numerical data for such three examples are given respectively in the three following tables, in which $R_1$, $R_2$...designate the radii of curvature of the individual surfaces of the objective counting from the front, the positive sign indicating that the surface is convex to the front and the negative sign that it is concave thereto, $D_1$, $D_2$...designate the axial thicknesses of the individual elements of the objective, and $S_1$, $S_2$...designate the axial air separations between the components of the objective. The tables also give the mean refractive indices $n_d$ for the $d$-line of the spectrum and the Abbe V numbers of the materials from which the various elements of the objective are made, and in addition the clear diameters of the various surfaces of the objective.

The second section of each table gives the values of the three variable axial air separations between the four members of the objective, for a number of representative zooming positions, for which the corresponding values of the equivalent focal length F of the complete objective from its minimum value $F_o$ to its maximum value $F_m$ are also given, together with the corresponding values of log F.

The third section of each table gives, for each of a set of representative values of the distance $d$ of the object in front of the front surface $R_1$ of the objective, the values of the two variable axial air separations between the three portions of the front member of the objective.

Two of the three examples include an aspheric surface, and the tables for such examples have a fourth section giving the equation defining an axial section through such aspheric surface.

The dimensions in all the tables are oin terms of the minimum equivalent focal length $F_o$.

It should be mentioned that the equals signs (=) in these tables have been inserted solely to comply with the usual Patent Office practice, and that such signs, as also the positive signs (+) and the negative signs (−), are not intended to be interpreted in accordance with their usual mathematical significance. For, the linear dimensions specified are not absolute values but are values relative to the minimum equivalent focal length $F_o$, and moreover some of the individual radii of curvature, which are marked, say, with the positive sign (+), require to be treated as positive only in the calculation of some of the individual aberrations and to be treated as negative in the calculation of other aberrations, as is well known in the art.

In the first of the three examples, the members movable for zooming purposes are arranged in accordance with the invention of the copending U.S. Pat. application Ser. No. 309,208, filed on Sept. 16, 1963 in the names of G.H. Cook and P. A. Merigold. The objective according to such copending application has four members, of which the first (counting from the front) for a given object distance remains stationary during the zooming relative movements, the second and third are divergent and movable, and the fourth is convergent and stationary, the minimum separation between the second and third members occurring when the equivalent focal length of the objective is greater than half its maximum value in the range of variation, while the equivalent focal lengths $f_B$ and $f_C$ respectively of the movable second and third members lie numerically respectively between four and eight times the minimum value of the ratio of the equivalent focal length of the objective to the $f$-number of the objective in the range of variation and between five and 10 times such minimum ratio, the divergent movable second member consisting of a divergent simple meniscus component with its surfaces convex to the front followed by a divergent compound component and performing during the range of variation a total axial movement lying numerically between $1.5f_B$ and $2.5f_B$, while the divergent movable third member consists of a doublet component having a front surface concave to the front with radius of curvature lying numerically between $0.5f_C$ and $1.0f_C$ and performs during the range of variation a total axial movement lying numerically between $0.25f_C$ and $0.5f_C$.

EXAMPLE I

| Radius | Thickness or air separation | Refractive index $n_d$ | Abbé V Number | Clear diameter |
|---|---|---|---|---|
| $R_1=+8.9126$ | $D_1=0.1019$ | 1.68868 | 49.63 | $R_1=2.127$ |
| $R_2=-18.0832$ | $D_2=0.068$ | 1.78456 | 26.10 | $R_2=2.124$ |
| $R_3=+3.9783$ | $S_1=$variable | | | $R_3=2.036$ |
| $R_4=+5.0561$ | $D_3=0.2122$ | 1.62077 | 60.53 | $R_4=2.043$ |
| $R_5=-5.0561$ | $S_2=0.0017$ | | | $R_5=2.043$ |
| $R_6=+2.1736$ | $D_4=0.2122$ | 1.62093 | 60.44 | $R_6=1.955$ |
| $R_7=+16.7001$ | $S_3=$variable | | | $R_7=1.950$ |
| $R_8=+55.1268$ | $D_5=0.068$ | 1.62018 | 60.38 | $R_8=1.935$ |
| $R_9=+5.0011$ | $S_4=$variable | | | $R_9=1.861$ |
| $R_{10}=+2.2196$ | $D_6=0.045$ | 1.6968 | 56.33 | $R_{10}=1.36$ |
| $R_{11}=+0.9714$ | $S_5=0.290$ | | | $R_{11}=1.185$ |
| $R_{12}=-2.1975$ | $D_7=0.040$ | 1.6968 | 56.33 | $R_{12}=1.177$ |
| $R_{13}=+2.4990$ | $D_8=0.170$ | 1.78503 | 26.09 | $R_{13}=1.127$ |
| $R_{14}=-2.4990$ | $D_9=0.040$ | 1.6968 | 56.33 | $R_{14}=1.116$ |
| $R_{15}=+4.5842$ | $S_6=$variable | | | $R_{15}=1.073$ |
| $R_{16}=-1.0424$ | $D_{10}=0.030$ | 1.6968 | 56.33 | $R_{16}=0.624$ |
| $R_{17}=+1.0424$ | $D_{11}=0.085$ | 1.78502 | 26.09 | $R_{17}=0.656$ |
| $R_{18}=+7.7833$ | $S_7=$variable | | | $R_{18}=0.664$ |
| $R_{19}=$stop | $S_8=0.050$ | | | $R_{19}=0.685$ |
| $R_{20}=+3.4495$ | $D_{12}=0.100$ | 1.52372 | 59.16 | $R_{20}=0.709$ |
| $R_{21}=-2.0422$ | $S_9=0.0025$ | | | $R_{21}=0.721$ |
| $R_{22}=+1.1240$ | $D_{13}=0.100$ | 1.52372 | 59.16 | $R_{22}=0.732$ |
| $R_{23}=+19.8334$ | $S_{10}=0.0025$ | | | $R_{23}=0.728$ |
| $R_{24}=+0.8336$ | $D_{14}=0.100$ | 1.52372 | 59.16 | $R_{24}=0.709$ |
| $R_{25}=+2.4990$ | $S_{11}=0.1899$ | | | $R_{25}=0.688$ |
| $R_{26}=$aspheric | $D_{15}=0.222$ | 1.72874 | 28.67 | $R_{26}=0.605$ |
| $R_{27}=+0.6773$ | $S_{12}=0.254$ | | | $R_{27}=0.552$ |
| $R_{28}=+1.8282$ | $D_{16}=0.05$ | 1.72874 | 28.67 | $R_{28}=0.576$ |
| $R_{29}=+1.2010$ | $D_{17}=0.125$ | 1.62041 | 60.29 | $R_{29}=0.576$ |
| $R_{30}=-1.3298$ | | | | $R_{30}=0.578$ |

Axial air separations variable for zooming purposes

| $S_4$ | $S_6$ | $S_7$ | log F | F |
|---|---|---|---|---|
| 0.0267 | 1.6413 | 0.5252 | 0 | 1.0 |
| 0.5241 | 1.1259 | 0.5434 | 0.152 | 1.42 |
| 1.1803 | 0.4828 | 0.5303 | 0.403 | 2.54 |
| 1.6734 | 0.1288 | 0.3811 | 0.653 | 4.5 |
| 2.0027 | 0.1332 | 0.0574 | 0.903 | 8.0 |

Axial air separations variable for focussing purposes

| d | $s_1$ | $s_2$ |
|---|---|---|
| ∞ | 0.2547 | 0.0408 |
| 250 | 0.2239 | 0.0716 |
| 100 | 0.1750 | 0.1205 |
| 40 | 0.0408 | 0.2547 |

Equation for aspheric surface $R_s$:

$$z = -3.2667 + \sqrt{10.6713 - y^2} - 0.0375y^4 + 0.1003y^6 - 0.3653y^8 - 0.8664y^{10}$$

In this example, the maximum value $F_m$ of the equivalent focal length F of the objective in the zooming range of variation is eight times the minimum value $F_o$ thereof. The example is corrected for a relative aperture of $f/4.0$. The back focal distance from the rear surface $R_{30}$ of the objective to the image plane is $4.59 F_o$. The length of the semidiagonal of the rectangular image field is $0.4 F_o$.

The objective covers a semiangular field of view varying from 2.8 degrees at $F_m$ to 21 degrees at $F_o$.

The front member includes the surfaces $R_1$–$R_9$, the movable second member the surfaces $R_{10}$–$R_{15}$, the movable third member the surfaces $R_{16}$–$R_{18}$ and the stationary rear member the surfaces $R_{20}$–$R_{30}$.

The iris diaphragm, indicated in the above table by the reference $R_{19}$, is stationary and is located behind the movable third member and in front of the stationary rear member.

The equivalent focal length $f_A$ of the front member for an infinitely distant object is $+3.5638 F_o$, that $f_B$ of the movable second member is $-1.1762 F_o$, that $f_C$ of the movable third member is $-1.4541 F_c$ and that $f_D$ of the stationary rear member is $+1.1813 F_o$, the positive and negative signs respectively indicating convergence and divergence.

The front member has a stationary divergent front portion including the surfaces $R_1$–$R_3$, a movable convergent middle portion including the surfaces $R_4$–$R_7$, and a stationary divergent rear portion including the surfaces $R_8$–$R_9$. The equivalent focal length of the front portion is $-8.0804 F_o$, that is numerically, $2.268 f_A$. The equivalent focal length of the movable middle portion is $+2.0386 F_o$, that is $0.572 f_A$. The equivalent focal length of the stationary rear portion is $-9.0359 F_o$, that is numerically $2.535 f_A$.

The stationary front portion of the front member consists of a divergent doublet component having a dispersive internal contact $R_2$. The radius of curvature $R_3$ of the rear surface of such portion is $3.9783 F_o$ or $1.12 f_A$. The mean refractive index of the material of the divergent rear element of such component exceeds that of the convergent front element by 0.09588, while the Abbe V number of the material of the front element exceeds that of the rear element by 23.53. The arithmetic mean between the mean refractive indices of the materials of these two elements is 1.73662. The internal contact $R_2$ is concave to the front with radius of curvature $18.0832 F_o$ or $5.07 f_A$.

The movable middle portion if the front member consists of two simple convergent components, the equivalent focal length of the front component being $+4.1054 F_o$ or $1.15 f_A$, while that of the rear component is $+4.0019 F_o$ or $1.12 f_A$. The radius of curvature of the front surface $R_4$ of the front component is $5.0561 F_o$ or $1.42 f_A$, and that of the front surface $R_6$ of the rear component is $2.1736 F_o$ or $0.61 f_A$, such surfaces both being convex to the front. The sum of the axial thicknesses of the two components is $0.4244 F_o$ or $0.12 f_A$. The arithmetic mean between the mean refractive indices of the materials of the two components is 1.621 and the arithmetic mean between the Abbe V numbers of such materials is 60.5. The total axial movement of the middle portion is $0.2139 F_o$, which is about 0.11 times the equivalent focal length of such middle portion.

The stationary rear portion of the front member is in the form of a simple divergent component, whose rear surface $R_9$ is convex to the front with radius of curvature $5.0911 F_o$ or $1.40 f_A$.

The arithmetic mean between the Abbe V numbers of the materials of the front element of the front doublet component and of the rear simple component of the front member is 55.00.

The minimum value of the ratio of the equivalent focal length F of the complete objective to the $f$-number of the objective is $0.25 F_o$, and the equivalent focal length $f_A$ of the front member of the objective is $3.5638 F_o$, which amounts to 14.3 times such minimum ratio.

Turning now to the remaining members of the objective concerned with the zooming movements, the second and third members of the objective, movable for zooming purposes, are each divergent and the stationary rear member is convergent.

The minimum separation between the second and third members occurs when the equivalent focal length of the objective is $5.96 F_o$, or $0.745 F_m$. The equivalent focal length $f_B$ of the second member is numerically 4.70 times the minimum value of the ratio of the equivalent focal length F to the $f$-number of the objective, and the equivalent focal length $f_C$ of the third member is numerically 5.82 times such minimum ratio. The second member performs a total axial movement equal to $1.9760 F_o$ or $1.68 f_B$ in the zooming range, and the total axial movement of the third member is $0.4678 F_o$ or $0.32 f_C$. During a zooming movement to increase the equivalent focal length of the objective, the second member moves rearwardly, while the third member at first moves a short distance forwardly and then a longer distance rearwardly.

The movable second member consists of a divergent simple meniscus component, whose front and rear surfaces $R_{10}$ and $R_{11}$ have radii of curvature respectively numerically equal to $1.89 f_B$ and $0.83 f_B$, followed by a divergent triplet component having a convergent element between two divergent elements. The radii of curvature of the front and rear surfaces $R_{12}$ and $R_{15}$ of such triplet component are respectively numerically equal to $1.87 f_B$ and $3.90 f_B$. The three divergent elements of the second member are all made of the same material, whose Abbe V number exceeds that of the material of the convergent middle element of the triplet by 30.24, the mean refractive index of the latter material exceeding that of the former material by 0.088.

The movable third member consists of a divergent doublet component having a collective internal contact $R_{17}$ whose radius of curvature is numerically equal to $0.72 f_C$, the front surface $R_{16}$ of such component having radius of curvature also equal to $0.72 f_C$. The divergent front element of such component is made of the same material as the divergent elements of the second member, and the convergent rear element thereof of the same material as the convergent element of the second member.

The stationary rear member may take various forms, but in the example consists of three convergent simple components followed by a divergent simple component and a convergent doublet component having a divergent element in front of a convergent element. The front surface $R_{26}$ of the divergent simple component is made aspheric and at its vertex is concave to the front with radius of curvature numerically equal to $3.2667 F_o$.

In this example the residual aberrations of the front three members are well stabilized throughout the focusing and zooming ranges, and the arrangement chosen for the rear member is especially convenient for balancing out such residual aberrations, especially the primary aberrations, the aspheric surface assisting in correction of the higher order aberrations, especially spherical aberrations and coma. The zooming movements are such that there is an approximately logarithmic law interconnecting the variation of the equivalent focal length of the objective and the movement of the zooming control element so that a constant rate of movement of such element will produce an approximately constant rate of change of log F, thereby producing an approximately constant rate of growth of image size throughout the zooming range.

Still better aberration correction can be obtained throughout the focusing range and throughout a much-increased zooming range, by using the present invention in combination with the invention of the copending U.S. Pat application. Ser. No. 561,539 filed on June 29, 1966, in the name of the present inventor, and the second and third examples now to be described are both of this kind. The optical objective of the zoom type, in accordance with such copending application is corrected for spherical and chromatic aberrations, coma, astigmatism, field curvature and distortion, and has four members, of which the first (counting from the front) is convergent and for a given object distance remains stationary during the zooming relative movements, the second and third are divergent and movable, and the fourth is convergent and stationary. The minimum separation between the second and third members occurring when the equivalent focal length of the objective lies between a half and three-quarters of its maximum value in the range of variation, the equivalent focal lengths $f_B$ and $f_C$ respectively of the movable second and third members each lying numerically between three and six times the minimum value of the ratio of the equivalent focal length of the objective to the $f$-number of the objective in the range of variation, the C divergent second member consisting of a divergent meniscus compound component, with its air-exposed surfaces convex to the front, having equivalent focal length between $4f_B$ and $8f_B$, followed by a divergent simple component having equivalent focal length between $0.75f_B$ and $2f_B$, such second member performing in the range of variation a total axial movement lying numerically between $1.5f_B$ and $2.5f_B$, while the movable divergent third member consists of a divergent compound component having equivalent focal length between $1.5f_C$ and $3f_C$, followed by a divergent simple meniscus component with its surfaces concave to the front having equivalent focal length between $1.5f_C$ and $3f_C$ such third member performing in the range of variation a total axial movement lying numerically between $0.5f_C$ and $0.75f_C$:

EXAMPLE I

| Radius | Thickness or air separation | Refractive index $n_d$ | Abbé V Number | Clear diameter |
|---|---|---|---|---|
| $R_1=+10.5067$ | | | | $R_1=2.133$ |
| | $D_1=0.12$ | 1.68869 | 49.63 | |
| $R_2=-21.3040$ | | | | $R_2=2.130$ |
| | $D_2=0.08$ | 1.78457 | 26.10 | |
| $R_3=+4.6854$ | | | | $R_3=2.114$ |
| | $S_1=$variable | | | |
| $R_4=+5.9548$ | | | | $R_4=2.180$ |
| | $D_3=0.25$ | 1.62078 | 60.50 | |
| $R_5=-5.9548$ | | | | $R_5=2.180$ |
| | $S_2=0.002$ | | | |
| $R_6=+2.5600$ | | | | $R_6=2.103$ |
| | $D_4=0.25$ | 1.62094 | 60.44 | |
| $R_7=+19.6616$ | | | | $R_7=2.078$ |
| | $S_3=$variable | | | |
| $R_8=+67.2000$ | | | | $R_8=2.057$ |
| | $D_5=0.08$ | 1.62109 | 60.38 | |
| $R_9=+6.0200$ | | | | $R_9=1.988$ |
| | $S_4=$variable | | | |
| $R_{10}=+2.6352$ | | | | $R_{10}=1.100$ |
| | $D_6=0.033$ | 1.69864 | 55.99 | |
| $R_{11}=+0.7174$ | | | | $R_{11}=0.968$ |
| | $D_7=0.133$ | 1.78478 | 26.09 | |
| $R_{12}=+1.4174$ | | | | $R_{12}=0.945$ |
| | $S_5=0.117$ | | | |
| $R_{13}=-3.2390$ | | | | $R_{13}=0.944$ |
| | $D_8=0.033$ | 1.69843 | 56.09 | |
| $R_{14}=+1.5127$ | | | | $R_{14}=0.891$ |
| | $S_6=$variable | | | |
| $R_{15}=-1.5600$ | | | | $R_{15}=0.653$ |
| | $D_9=0.093$ | 1.78424 | 26.10 | |
| $R_{16}=-0.6703$ | | | | $R_{16}=0.663$ |
| | $D_{10}=0.031$ | 1.62304 | 57.05 | |
| $R_{17}=+4.3480$ | | | | $R_{17}=0.679$ |
| | $S_7=0.058$ | | | |
| $R_{18}=-1.3076$ | | | | $R_{18}=0.679$ |
| | $D_{11}=0.031$ | 1.69898 | 56.12 | |
| $R_{19}=-7.6946$ | | | | $R_{19}=0.703$ |
| | $S_8=$variable | | | |
| $R_{20}=$stop | | | | $R_{20}=0.932$ |
| | $S_9=0.02$ | | | |
| $R_{21}=+4.6008$ | | | | $R_{21}=0.958$ |
| | $D_{12}=0.128$ | 1.48767 | 69.95 | |
| $R_{22}=-1.9183$ | | | | $R_{22}=0.0970$ |
| | $S_{10}=0.0016$ | | | |
| $R_{23}=+2.7306$ | | | | $R_{23}=0.991$ |
| | $D_{13}=0.108$ | 1.51009 | 64.22 | |
| $R_{24}=-3.9054$ | | | | $R_{24}=0.991$ |
| | $S_{11}=0.0016$ | | | |

EXAMPLE I—Continued

| Radius | Thickness or air separation | Refractive index $n_d$ | Abbé V Number | Clear diameter |
|---|---|---|---|---|
| $R_{25}=$aspheric | | | | $R_{25}=0.978$ |
| | $D_{14}=0.108$ | 1.51009 | 64.22 | |
| $R_{26}=+4.7862$ | | | | $R_{26}=0.960$ |
| | $S_{12}=0.0016$ | | | |
| $R_{27}=+1.0558$ | | | | $R_{27}=0.932$ |
| | $D_{15}=0.192$ | 1.48767 | 69.95 | |
| $R_{28}=-2.8624$ | | | | $R_{28}=0.907$ |
| | $D_{16}=0.057$ | 1.78483 | 26.09 | |
| $R_{29}=+2.0717$ | | | | $R_{29}=0.856$ |
| | $S_{13}=0.700$ | | | |
| $R_{30}=+1.1812$ | | | | $R_{30}=0.621$ |
| | $D_{17}=0.054$ | 1.69835 | 56.16 | |
| $R_{31}=+0.7017$ | | | | $R_{31}=0.588$ |
| | $S_{14}=0.0454$ | | | |
| $R_{32}=+1.8905$ | | | | $R_{32}=0.588$ |
| | $D_{18}=0.06$ | 1.70076 | 30.30 | |
| $R_{33}=+7.3882$ | | | | $R_{33}=0.580$ |

Axial air separations variable for zooming purposes

| $S_4$ | $S_6$ | $S_8$ | F | log F |
|---|---|---|---|---|
| 0.018 | 2.293 | 0.683 | 1.0 | 0 |
| 1.076 | 1.202 | 0.716 | 2.0 | 0.301 |
| 1.848 | 0.463 | 0.683 | 4.0 | 0.602 |
| 2.406 | 0.110 | 0.479 | 8.0 | 0.903 |
| 2.712 | 0.258 | 0.025 | 16.0 | 1.204 |

Axial air separations variable for focussing purposes

| d | $S_1$ | $S_3$ |
|---|---|---|
| ∞ | 0.30 | 0.043 |
| 250 | 0.2571 | 0.0909 |
| 150 | 0.2272 | 0.1206 |
| 75 | 0.148 | 0.200 |
| 48 | 0.048 | 0.30 |

Equation for aspheric surface $R_{25}$ $x = 1.777 - \sqrt{3.160-y^2} - 0.0089\, y^4 + 0.0219\, y^6 - 0.0039\, y^8 + 0.0676\, y^{10}$

EXAMPLE III

| Radius | Thickness or air separation | Refractive index $n_d$ | Abbé V Number | Clear diameter |
|---|---|---|---|---|
| $R_1=+21.0134$ | | | | $R_1=4.266$ |
| | $D_1=0.240$ | 1.68869 | 49.63 | |
| $R_2=-42.6080$ | | | | $R_2=4.260$ |
| | $D_2=0.160$ | 1.78457 | 26.10 | |
| $R_3=+9.3708$ | | | | $R_3=4.227$ |
| | $S_1=$variable | | | |
| $R_4=+11.9096$ | | | | $R_4=4.360$ |
| | $D_3=0.500$ | 1.62078 | 60.50 | |
| $R_5=-11.9096$ | | | | $R_5=4.360$ |
| | $S_2=0.004$ | | | |
| $R_6=+5.1200$ | | | | $R_6=4.206$ |
| | $D_4=0.500$ | 1.62094 | 60.44 | |
| $R_7=+39.3232$ | | | | $R_7=4.157$ |
| | $S_3=$variable | | | |
| $R_8=+134.400$ | | | | $R_8=4.114$ |
| | $D_5=0.160$ | 1.62109 | 60.38 | |
| $R_9=+12.0400$ | | | | $R_9=3.976$ |
| | $S_4=$variable | | | |
| $R_{10}=+5.2704$ | | | | $R_{10}=2.199$ |
| | $D_6=0.066$ | 1.69864 | 55.99 | |
| $R_{11}=+1.4347$ | | | | $R_{11}=1.935$ |
| | $D_7=0.2656$ | 1.78478 | 26.09 | |
| $R_{12}=+2.8349$ | | | | $R_{12}=1.890$ |
| | $S_5=0.2336$ | | | |
| $R_{13}=-6.4781$ | | | | $R_{13}=1.888$ |
| | $D_8=0.066$ | 1.69843 | 56.09 | |
| $R_{14}=+3.0254$ | | | | $R_{14}=1.782$ |
| | $S_6=$variable | | | |
| $R_{15}=-3.1201$ | | | | $R_{15}=1.306$ |
| | $D_9=0.1864$ | 1.78424 | 26.10 | |
| $R_{16}=-1.3406$ | | | | $R_{16}=1.326$ |
| | $D_{10}=0.0624$ | 1.62304 | 57.05 | |
| $R_{17}=+8.6960$ | | | | $R_{17}=1.358$ |
| | $S_7=0.116$ | | | |
| $R_{18}=-2.6152$ | | | | $R_{18}=1.358$ |
| | $D_{11}=0.0624$ | 1.69898 | 56.12 | |
| $R_{19}=-15.3891$ | | | | $R_{19}=1.406$ |
| | $S_8=$variable | | | |
| $R_{20}=$stop | | | | $R_{20}=1.862$ |
| | $S_9=0.144$ | | | |
| $R_{21}=-9.7648$ | | | | $R_{21}=1.917$ |
| | $D_{12}=0.240$ | 1.51003 | 64.18 | |
| $R_{22}=-2.4504$ | | | | $R_{22}=1.954$ |
| | $S_{10}=0.004$ | | | |
| $R_{23}=+9.0738$ | | | | $R_{23}=2.014$ |
| | $D_{13}=0.200$ | 1.51003 | 64.18 | |
| $R_{24}=-6.5646$ | | | | $R_{24}=2.019$ |
| | $S_{11}=0.004$ | | | |
| $R_{25}=+3.3548$ | | | | $R_{25}=2.008$ |
| | $D_{14}=0.464$ | 1.51003 | 64.18 | |
| $R_{26}=-3.6480$ | | | | $R_{26}=1.966$ |
| | $D_{15}=0.128$ | 1.78467 | 26.08 | |

EXAMPLE III — Continued

| Radius | Thickness or air separation | Refractive index $n_d$ | Abbé V Number | Clear diameter |
|---|---|---|---|---|
| $R_{27} = +46.400$ | | | | $R_{27} = 1.935$ |
| | $S_{13} = 4.480$ | | | |
| $R_{28} = +2.7072$ | | | | $R_{28} = 1.523$ |
| | $D_{14} = 0.108$ | 1.78467 | 26.08 | |
| $R_{29} = +1.4684$ | | | | $R_{29} = 1.478$ |
| | $D_{15} = 0.360$ | 1.51005 | 64.17 | |
| $R_{30} = -19.0144$ | | | | $R_{30} = 1.467$ |
| | $S_{13} = 0.004$ | | | |
| $R_{31} = +4.4476$ | | | | $R_{31} = 1.456$ |
| | $D_{16} = 0.200$ | 1.69935 | 41.13 | |
| $R_{32} = -56.2744$ | | | | $R_{32} = 1.425$ |

Axial air separations variable for zooming purposes

| $S_4$ | $S_6$ | $S_9$ | F | log F |
|---|---|---|---|---|
| 0.036 | 4.586 | 1.367 | 1.0 | 0 |
| 2.152 | 2.404 | 1.433 | 2.0 | 0.301 |
| 3.697 | 0.926 | 1.361 | 4.0 | 0.602 |
| 4.811 | 0.220 | 0.958 | 8.0 | 0.903 |
| 5.424 | 0.516 | 0.050 | 16.0 | 1.204 |

Axial air separations variable for focussing purposes

| d | $S_1$ | $S_3$ |
|---|---|---|
| ∞ | 0.600 | 0.096 |
| 500 | 0.5142 | 0.1818 |
| 300 | 0.4544 | 0.2416 |
| 150 | 0.296 | 0.400 |
| 96 | 0.096 | 0.600 |

In each of these two examples, the maximum value $F_m$ of the equivalent focal length of the objective is 16 times the minimum value $F_o$ thereof.

Example II, in the lower part of the zooming range from $F_o$ to 8.5 $F_o$, is corrected for a relative aperture of f/4.0. If such relative aperture were maintained throughout the zooming range, it would necessitate excessive diameters for the front member. Thus, for example in a practical form of the example, in which $F_o$ is two and one-half inches, the components of the front member would need to have diameters greater than 10 inches in order to give a relative aperture of f/4.0 for the 40-inch equivalent focal length at the upper end of the zooming range, which is obviously undesirable from the viewpoint of bulk, weight and cost. In order to keep the front member diameters within convenient limits, the arrangement is such that the relative aperture reduces from f/4.0 at 8.5 $F_o$ to f/7.5 at $F_m$ at an approximately linear rate relatively to log F.

Example III may be regarded as a variant of Example II having a differently arranged stationary rear member, which has a magnification equal to half that of the rear member of Example II, the whole system being scaled to give the same range of variation of equivalent focal length as Example II. As a result, Example III has a relative aperture of f/o from $F_o$ to 8.5 $F_o$, the relative aperture thereafter reducing (in approximately linear relationship to log F) to the value f/3.75 at $F_m$.

The back focal distance from the rear surface of the objective to the image plane is 2.3082 $F_o$ in Example II and 1.964 $F_o$ in Example III. In both examples, the objective covers a semiangular field of view varying from 1.2 degrees at $F_m$ to 17.75 degrees at $F_o$. The length of the diagonal of the rectangular image area is 0.64 $F_o$ in both examples.

The front member includes the surfaces $R_1$–$R_9$, the movable second member the surfaces $R_{10}$–$R_{14}$ and the movable third member the surfaces $R_{15}$–$R_{19}$ in both examples, while the stationary rear member includes the surfaces $R_{21}$–$R_{33}$ in Example II and $R_{21}$–$R_{32}$ in Example III.

The iris diaphragm, indicated in each table by the reference $R_{20}$, is stationary and is located between the third member and the rear member at a distance in front of the front surface $R_{21}$ of the rear member equal to 0.02 $F_o$ in Example II and 0.144 $F_o$ in Example III.

The equivalent focal length $f_A$ of the front member is +4.197 $F_o$ in Example II and +8.394 $F_o$ in Example III; that $f_B$ of the moving second member is −1.2915 $F_o$ in Example II and −2.583 $F_o$ in Example III; that $f_C$ of the moving third member is −1.149 $F_o$ in Example II and −2.298 $F_o$ in Example III; and that $f_D$ of the stationary rear member is +1.0775 $F_o$ in Example II and +9.329 $F_o$ in Example III; the positive and negative signs respectively indicating convergence and divergence.

The front member has a stationary divergent front portion including the surfaces $R_1$–$R_3$, a movable convergent middle portion including the surfaces $R_4$–$R_7$, and a stationary divergent rear portion including the surfaces $R_8$–$R_9$. The equivalent focal length of the front portion is −9.510 $F_o$ in Example II and −19.02 $F_o$ in Example III, that is numerically 2.266$f_A$ in each case. The equivalent focal length of the moving middle portion is +2.401 $F_o$ in Example II and +4.802 $F_o$ in Example III, that is numerically 0.57$f_A$ in each case. The equivalent focal length of the stationary rear portion is −10.65 $F_o$ in Example II and −21.3 $F_o$ in Example III, that is numerically 2.54$f_A$ in each case.

The stationary front portion of the front member consists of a divergent doublet component having a dispersive internal contact $R_2$, whose radius of curvature is numerically 5.08$f_A$ in each example. The radius of curvature of the rear surface $R_3$ of such portion is numerically 1.12$f_A$ in each example. The mean refractive index of the material of the divergent rear element of such doublet component exceeds that of the convergent front element thereof by 0.09588 in each example, while the Abbe V number of the material of the front element exceeds that of the rear element by 23.53 in each example. The arithmetic mean between the mean refractive indices of these two materials is 1.73662.

The movable middle portion of the front member consists of two simple convergent components, the front component having equivalent focal length +4.84 $F_o$ in Example II and +9.68 $F_o$ in Example III or +1.15$f_A$ in each case, while that of the rear component is +4.71 $F_o$ in Example II and +9.42 $F_o$ in Example III or 1.12$f_A$ in each case. In both examples the radius of curvature of the front surface $R_4$ of the front component is 1.42$f_A$, and that of the front surface of the rear component $R_6$ is 0.61$f_A$. The sum of the axial thicknesses of the two components is 0.5 $F_o$ in Example II and 1.0 $F_o$ in Example III, that is 0.12$f_A$ in each case. The arithmetic mean between the mean refractive indices of the materials of the two components is 1.621 and that between the Abbe V numbers of such materials is 60.5, in both examples. The total axial movement of such middle portion in the focusing range is 0.252 $F_o$ in Example II 0.504 $F_o$ in Example III, amounting in each case to 0.105 times the equivalent focal length of the middle portion.

The stationary rear portion of the front member consists of a divergent simple component, whose rear surface $R_9$ has radius of curvature equal to 1.43$f_A$.

The arithmetic mean between the Abbe V numbers of the materials of the front element of the front doublet component and of the rear simple component of the front member is 55.

The minimum value of the ratio of the equivalent focal length F of the complete objective to the f-number of the objective is 0.25 $F_o$ in Example II and 0.5 $F_o$ in Example III, and the equivalent focal length $f_A$ of the front member is 16.79 times such minimum ratio in each case.

The moving second and third members of the objective are each divergent and the stationary rear member is convergent. The minimum separation between the second and third members in the zooming range occurs in each example when the equivalent focal length F of the objective is 9.225 $F_o$, and amounts to 0.098 $F_o$ in Example II and 0.196 $F_o$ in Example III. The equivalent focal length $f_B$ of the second member is numerically 5.17 times the minimum value of the ratio of the equivalent focal length F of the objective to the f-number of the objective in each example. The equivalent focal length $f_C$ of the third member is numerically 4.60 times such minimum ratio in each example.

During a zooming movement to increase the equivalent focal length F of the objective, the second member moves rearwardly for the whole of the range and the third member moves forwardly for a short distance and then rearwardly to a position close to the iris diaphragm. The total axial movement of the second member is 2.694 $F_o$ in Example II and 5.388 $F_o$ in Example III that is 2.09$f_B$ in each case, and that of the third member 0.658 $F_o$ in Example II and 1.317 $F_o$ in Example III, that is 0.57$f_C$ in each case.

The movable second member consists of a divergent meniscus doublet component having equivalent focal length −6.65 $F_o$ in Example II and −13 3 $F_o$ in Example III, that is in each case 5 15$f_B$, followed by a divergent simple component having equivalent focal length −1.47 $F_o$ in Example II and −2.94 $F_o$ in Example III, that is in each case 1.14$f_B$. The radius of curvature of the front surface $R_{13}$ of such simple component is 2 29 times that of the rear surface $R_{12}$ of the doublet component. The radius of curvature of the front surface $R_{10}$ of the doublet component is numerically 2.04$f_B$ and that of the rear surface $R_{13}$ thereof is numerically 1.10$f_B$. The doublet component consists of a divergent element in front of a collective element, the internal contact $R_{11}$ being collective. The mean refractive index of the material of the convergent element exceeds that of the divergent element by 0.08614, and the Abbe V number of the divergent element exceeds that of the convergent element by 29.90. The average value of the mean refractive indices of the materials of the divergent element of such doublet component and of the divergent simple component is 1.69854, and the average value of the Abbe V numbers of such materials is 56.04.

The movable third member consists of a divergent doublet component, having equivalent focal length −2.47 $F_o$ in Example II and −4.94 $F_o$ in Example III or 2.16$f_C$ in each case, followed by a divergent simple meniscus component having equivalent focal length −2.26 $F_o$ in Example II and −4.52 $F_o$ in Example III, or 1.97$f_C$ in each case. The radius of curvature of the rear surface $R_{17}$ of the doublet component is numerically 3.32 times that of the front surface $R_{16}$ of the simple component. The doublet component has a convergent element in front of a divergent element with a collective internal contact $R_{16}$ whose radius of curvature is numerically 0.58$f_C$. The mean refractive index of the material of the convergent element in such doublet component exceeds that of the divergent element by 0.16120, and the Abbe V number of the material of the divergent element exceeds that of the convergent element by 30.95. The average value of the mean refractive indices of the materials of the divergent rear element of the doublet component and of the simple component is 1.66101 and the average value of the Abbe V numbers of such materials is 56.58. The radius of curvature of the front surface $R_{18}$ of the simple component is numerically 1.14$f_C$ and that of the front surface $R_{16}$ of the doublet component is numerically 1.36$f_C$.

The zooming movements of the second and third members are such that the variation of the equivalent focal length of the objective and the movement of the zooming control element are interrelated by an approximately logarithmic law, so that with a constant rate of movement of the control element log F varies at an approximately constant rate so that there is a fairly steady rate of growth of the image size throughout the zooming range. The various aberrations are well stabilized by the front three members throughout the zooming range and throughout the focusing range in both examples, and such residual stabilized aberrations are balanced out in the stationary rear member. The construction of such rear member may vary widely.

In Example II, the stationary rear member has been designed to have a strong telephoto characteristic in order to keep the forward projection of the objective from the image plane as short as possible. This member consists in turn from the front of three convergent simple components, a convergent doublet component having a dispersive internal contact $R_{20}$, a divergent simple component and a convergent simple component, with a relatively large air separation $S_{13}$ between the doublet component and the divergent simple component. An aspheric surface is included to assist in the balancing out of some of the higher order aberrations, and in the example this aspheric surface is located at the front surface $R_{25}$ of the third convergent simple component. Such aspheric surface is convex to the front at its vertex.

In Example III, a modified construction of rear member is used comprising two convergent simple components followed by two convergent doublet components and a convergent simple component. This rear member does not include an aspheric surface. Such rear member has a much greater equivalent focal length than that of Example II and has a magnification 1.104, half that of Example II, the geometrical dimensions of the front three members being double those of Example II, thus giving the same range of variation of the equivalent focal length of the objective as in Example II.

In both examples the standard of aberration correction is high, with only a relatively small falling off at the upper end of the range of variation of equivalent focal length, where it is least important, and there is little variation in the standard of aberration correction throughout the focusing range. The construction of the front member is such that its equivalent focal length varies little during the focusing movement and such variation is in fact compensated by the corresponding variation in the position of the rear nodal point of the front member.

It will be appreciated that the foregoing examples have been given by way of example only and that various modifications within the scope of the invention may be made. Thus, the construction of the three individual portions of the front member may vary. For instance, the stationary front portion thereof may consist in some instances, where a low relative aperture is sufficient, of a simple component instead of a compound component. The moving middle portion may have a compound component in place of either or each of the simple components, or in some instances may consist merely of one compound component. The stationary rear portion may consist of a compound component instead of a simple component. Again, the front member, arranged in accordance with the present invention, may be used in combination with types of zooming system other than those above described, but is especially advantageous when used in combination with the zooming system of Examples II and III.

I claim:

1. In an optical objective of the zoom type comprising a front member which for a given object position remains stationary during the zooming relative movements, an assembly located behind the front member and incorporating the members of the objective movable for zooming purposes, and a stationary rear member behind such assembly, the improved front member which is divided into three portions, focusing to suit different object positions being effected by axial movement only of the middle portion of the front member, the front and rear portions thereof remaining stationary, each of such front and rear portions being divergent and having equivalent focal length numerically lying between 1.5$f_A$ and 7.5$f_A$ (where $f_A$ is the equivalent focal length of the complete front member when focused for an infinitely distant object), while the movable middle portion of the front member is convergent and has equivalent focal length lying numerically between 0.25$f_A$ and 1.0$f_A$.

2. An optical objective front member as claimed in claim 1, in which the rear surface of the stationary front portion of the front member is convex to the front with radius of curvature approximately $f_A$.

3. An optical objective front member as claimed in claim 2, in which the stationary front portion of the front member consists of a doublet component having a convergent element and a divergent element, with a dispersive internal contact between such elements, such internal contact being concave to the front.

4. An optical objective front member as claimed in claim 1, in which the front member of the objective comprises a stationary front portion constituted by a divergent doublet component having its rear surface convex to the front, a stationary rear portion constituted by a simple divergent component having its rear surface convex to the front, and a movable middle portion constituted by two simple convergent components, the total axial movement of such middle portion within the focusing range lying between 0.05 and 2.0 times the equivalent focal length of such middle portion.

5. An optical objective front member as claimed in claim 1, in which the movable middle portion of the front member consists of two convergent components, each having equivalent focal length between $0.75 f_A$ and $1.5 f_A$.

6. An optical objective front member as claimed in claim 1, in which the total axial movement of the movable middle portion of the front member within the focusing range lies between 0.05 and 2.0 times the equivalent focal length of such middle portion.

7. In an optical objective of the zoom type, a front member which remains stationary during zooming and comprises three portions of which the middle portion alone is movable for focusing, said front member being constructed substantially in accordance with the following table:

| Radius | Thickness or Air Separation | Refractive Index $n_d$ |
|---|---|---|
| $R_1 = 8.9126$ | | |
| | $D_1 = 0.1019$ | 1.68868 |
| $R_2 = -18.0832$ | | |
| | $D_2 = 0.068$ | 1.78456 |
| $R_3 = +3.9783$ | | |
| | $S_1$ variable | |
| $R_4 = +5.0561$ | | |
| | $D_3 = 0.2122$ | 1.62077 |
| $R_5 = -5.0561$ | | |
| | $S_2 = 0.0017$ | |
| $R_6 = +2.1736$ | | |
| | $D_4 = 0.2122$ | 1.62093 |
| $R_7 = +16.7001$ | | |
| | $S_3$ variable | |
| $R_8 = +55.1268$ | | |
| | $D_5 = 0.068$ | 1.62018 |
| $R_9 = +5.0911$ | | |
| | $S_4$ variable | |

Axial Air Separations Variable for Focusing Purposes

| d | $S_1$ | $S_3$ |
|---|---|---|
| ∞ | 0.2547 | 0.0408 |
| 250 | 0.2239 | 0.0716 |
| 100 | 0.1750 | 0.1205 |
| 40 | 0.0408 | 0.2547 |

8. In an optical objective of the zoom type, a front member which remains stationary during zooming and comprises three portions of which the middle portion alone is movable for focusing, said front member being constructed substantially in accordance with the following table:

| Radius | Thickness or Air Separation | Refractive Index $nd$ |
|---|---|---|
| $R_1 = 10.5067$ | | |
| | $D_1 = 0.12$ | 1.68869 |
| $R_2 = -21.3040$ | | |
| | $D_2 = 0.08$ | 1.78457 |
| $R_3 = +4.6854$ | | |
| | $S_1$ variable | |
| $R_4 = +5.9548$ | | |
| | $D_3 = 0.25$ | 1.62078 |
| $R_5 = -5.9548$ | | |
| | $S_2 = 0.002$ | |
| $R_6 = +2.5600$ | | |
| | $D_4 = 0.25$ | 1.62094 |
| $R_7 = +19.6616$ | | |
| | $S_3$ variable | |
| $R_8 = +67.2000$ | | |
| | $D_5 = 0.08$ | 1.62109 |
| $R_9 = +6.0200$ | | |
| | $S_4$ variable | |

Axial Air Separations Variable for Focusing Purposes

| d | $S_1$ | $S_3$ |
|---|---|---|
| ∞ | 0.30 | 0.048 |
| 250 | 0.2571 | 0.0909 |
| 150 | 0.2272 | 0.1208 |
| 75 | 0.148 | 0.200 |
| 48 | 0.048 | 0.30 |

UNITED STATES PATENT OFFICE
CERTIFICATE OF CORRECTION

Patent No. 3,598,476     Dated August 10, 1971

Inventor(s) PETER ARNOLD MERIGOLD

It is certified that error appears in the above-identified patent and that said Letters Patent are hereby corrected as shown below:

[73] Assignee  The Rank Organisation Limited

Signed and sealed this 7th day of March 1972.

(SEAL)
Attest:

EDWARD M. FLETCHER, JR.            ROBERT GOTTSCHALK
Attesting Officer                   Commissioner of Patents